Jan. 2, 1940.  J. J. McCABE ET AL  2,185,215
MOTOR MOUNTING
Filed May 1, 1934    2 Sheets-Sheet 1
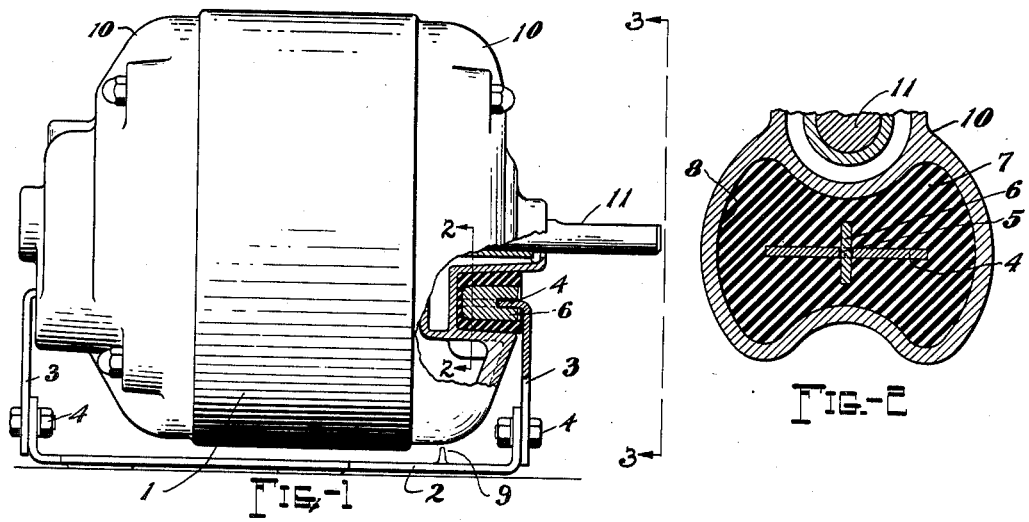
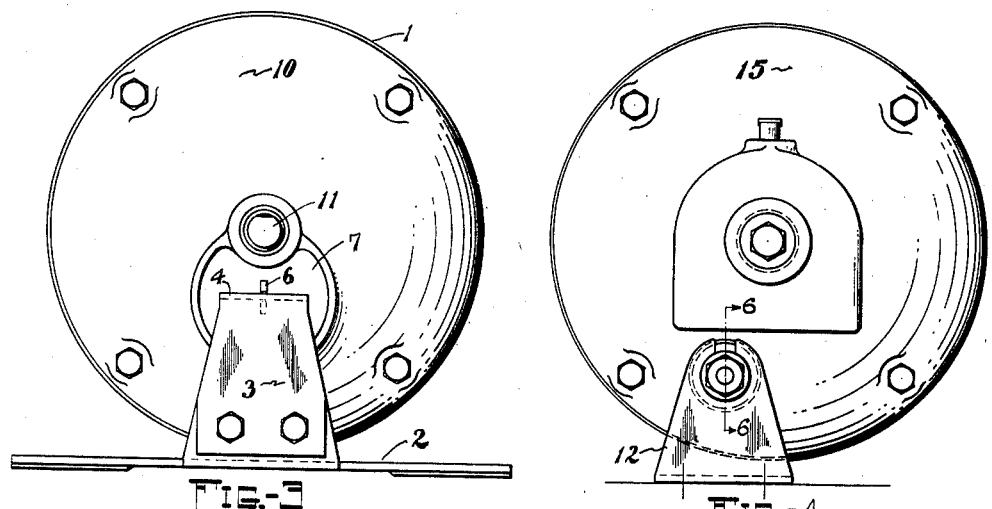
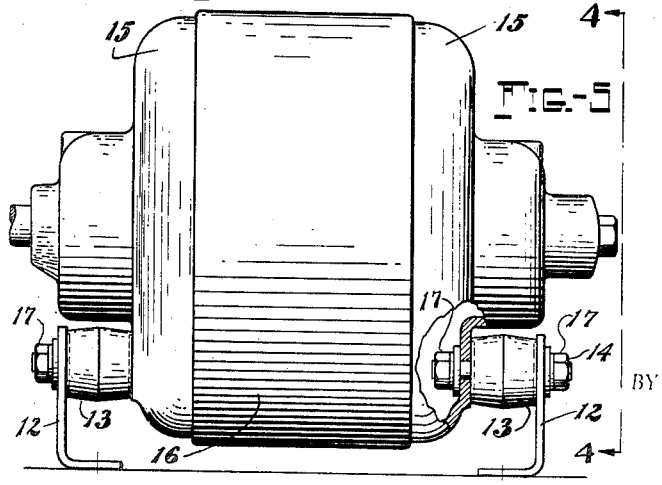
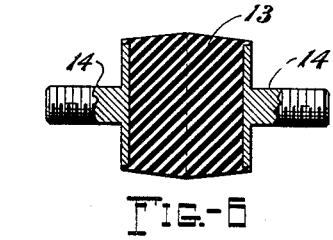
INVENTORS
JOHN J. McCABE
and PAUL E. FRANTZ
BY Edmund J. De Pao
Their ATTORNEY.

INVENTORS
JOHN J. McCABE
and PAUL E. FRANTZ
BY Edmund J. De Pas
Their ATTORNEY.

Patented Jan. 2, 1940

2,185,215

UNITED STATES PATENT OFFICE 2,185,215

MOTOR MOUNTING

John J. McCabe and Paul E. Frantz, Cleveland, Ohio, assignors to The Apex Electrical Manufacturing Company, Cleveland, Ohio, a corporation of Ohio Application May 1, 1934, Serial No. 723,422

4 Claims. (Cl. 248—23)

This invention relates to a mounting or suspension for the driving member of a power operated mechanism and it has particular relation to a vibration absorbing motor support for suppressing the undesirable effects produced by periodical varying forces or power impulses of a motor and for automatically maintaining proper tension in a power transmission belt connecting the motor and the mechanism which it is driving.

One of the objects of this invention is that of providing a flexible mounting for the driving member of a power operated belt driven mechanism in which such member is subjected to periodically varying forces, the mounting being adapted to absorb the vibration of such forces and to automatically maintain proper tension on a belt connecting the member to a driven device.

Another object of the invention is that of providing flexible mounting for the driving motor of a belt driven device, such mounting being adapted to absorb the pulsatory torque of the motor and to utilize the reaction of such torque to automatically maintain the tension of the belt in accordance with the belt load.

A further object of the invention relates to the provision of a generally simplified, inexpensive motor mounting for a belt driven power operated device such mounting being adapted to insulate the mounting from the motor, to prevent the transmission of sound vibrations from the motor to the mounting and to permit the motor to move about an axis eccentric to the motor axis to automatically maintain proper tension on the belt which the motor is driving.

With these and other objects in view, the invention consists in the novel construction, arrangement and combination of parts, hereinafter illustrated and described in some of its embodiments in the accompanying drawings, and particularly pointed out in the appended claims.

In the drawings:

Figure 1 is a side elevational view partly in section of a motor and its mounting illustrating one form of the invention.

Figure 2 is an enlarged detail sectional view of the motor mounting taken on line 2—2, Figure 1.

Figure 3 is an end elevational view of the device shown in Figure 1.

Figure 4 is an end elevational view of a motor and its support illustrating a different form of the invention.

Figure 5 is a side elevational view partly in section of the device shown in Figure 4.

Figure 6 is an enlarged detail sectional view of one of the elements of the motor supporting structure taken on the axis of such element.

Figure 7:
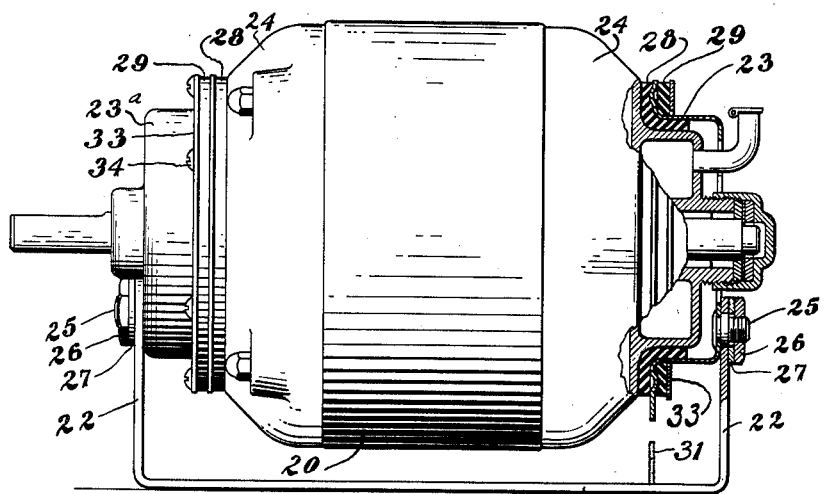
Figure 7 is a side elevational view of a motor and its mounting illustrating yet another form of the invention.

In the form of the invention illustrated in Figures 1 to 3 the numeral 1 indicates an electric motor of the type commonly used in connection with refrigerators, washing machines and other small electrically driven devices. The motor is supported by a base member 2 having upright arms 3—3 secured at opposite ends thereof by any suitable means such as bolts 4—4. The upright members 3 each have an inturned upper part 4 which is slotted at 5 for the reception of a vertically disposed anchoring plate 6.

The inturned part 4 and the plate 5 are received in a block of soft rubber 7 of non-circular outline which may be preformed and vulcanized to receive such parts or which may be vulcanized directly to the parts 4 and 6, whichever is preferable. These blocks are received in suitable similarly formed recesses 8 provided in the opposite ends of the motor caps 10—10. The projection 9 indicates a spark gap between the motor and its support provided for the purpose of getting rid of the electrostatic charge which develops in belt driving motors which are not grounded. The spark gap is of such width, however, that it will not ground the motor at the voltages impressed across the motor terminals. The blocks 7 are formed from a resilient, yielding, elastic dielectric material preferably rubber so that the motor is insulated against the conduction of sound and electricity to its base except as previously noted and so that it may be free to move a slight amount about an axis eccentric to the axis of the motor shaft 11.

The arrangements shown herein are intended primarily for use in connection with belt driven devices and when installed for use, the motor shaft 11 is provided with a belt pulley (not shown). The direction of rotation of the motor shaft 11 is such that when the motor is started or when the motor is suddenly subjected to a heavy load the opposite reactions between the rotatable armature and the pivotally supported stator of the motor cause the motor to swing about the axis of its support compressing part of the rubber blocks and moving in a direction tending to tighten the driving belt (not shown) which is in engagement with the motor belt pulley.

As an example of the proper direction of rotation of the motor armature, if a mechanism located to the right of Figure 3 is to be driven by the motor shown in this figure the motor armature should be driven in clockwise direction so that the reaction of the stator is in a counter-clockwise direction and thus by reason of the cited arrangement the belt is automatically tightened when subjected to a heavy load, and when the machine is operating under a reduced load, the belt tension is automatically lessened by the expansion of the compressed blocks so that slippage occasioned by the use of a loose belt and power losses occasioned by the use of a tight belt are respectively eliminated to a large extent by the simple expedients shown herein.

Figures 4 to 6 illustrate another form of the invention in which a motor supporting base (not shown) carries a pair of upright members 12—12, at the upper ends of which are secured motor supporting blocks 13—13. These blocks may be of cylindrical outline and they are preferably vulcanized to a pair of threaded end members 14—14 which are secured to the members 12—12 and to the end caps 15—15 of the motor 16 by means of nuts 17—17. The blocks 13 are preferably made of the same material as that used in the blocks 7, previously described and the effect and action of this support is substantially the same as that for the device shown in Figures 1 to 3. In both forms of the invention just described, the normal tension of the belt and the power which is transmitted from the motor through the belt, place the rubber blocks under an elastic stress which works with the reaction forces in opposition to the forces of the load and belt tension.

Figure 8:
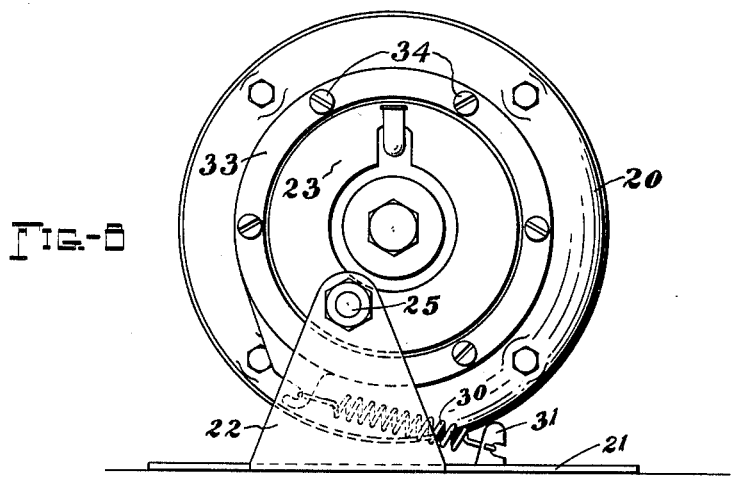
Figure 8 is an end elevational view of the device shown in Figure 7.
Figure 9:
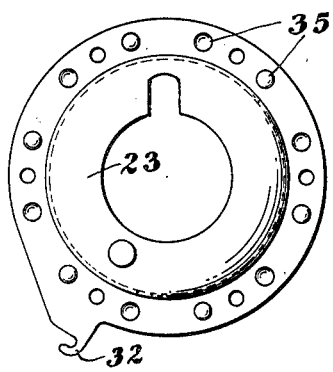
Figure 9 is an enlarged detail view of one of the elements of the motor support shown in Figures 7 and 8.

In the form of the invention illustrated in Figures 7 to 9 the motor 20 is carried by a supporting base member 21 having upturned end parts 22—22, to which are pivotally secured a pair of cupped plates 23, 23ª carried by the motor end caps 24—24. The securement of the plates to the base end parts is effected by means of bolts 25—25. These bolts are provided with lock nuts 26—26 and washers 27—27 so that a slight amount of friction may be introduced at the pivotal point of the motor support.

The cupped plates 23—23ª are insulated from the motor by gaskets or washers 28—28 and 29—29 which may be formed from soft rubber or any other suitable yielding elastic material. The upturned end parts 22—22 are spaced so as to cause the plates and their associated gaskets to frictionally and tightly grip the motor end caps. The gaskets 29 are each secured to their corresponding plates by means of a washer 33 and bolts or screws 34.

The motor is retained in its normal running position with a predetermined tension on the belt (not shown) which it is driving, by means of a spring 30 which engages at one end with a suitable abutment 31 carried by the base member 21 and at its other end it engages with an offset part 32 carried by the member 23. If desired the plate 23ª could be replaced by a plate such as 23 and two springs could then be used to hold the motor.

The plates 23 and 23ª are provided with a series of oppositely disposed depressions 35 for preventing relative movement between the plates and their gaskets. The axis of the pivotal support of the motor 20 in this case as in the preceding forms of the invention, is located below the axis of the motor shaft. The slight frictional resistance introduced by the tension of the nuts 26—26 on the friction washers 27—27 serves to dampen vibrations of the motor about its pivotal support which may occur during the operation of the motor and the same result is achieved in the forms of the invention illustrated in Figures 2 to 6 because of the inherent properties of the rubber blocks 7 and 13, the material of which serves to quickly dampen out any vibrations of the motor with respect to its support. The motor could be suspended from a point above its axis as in the case of the device shown in United States Patent No. 1,242,166, issued to J. W. Fitzgerald, October 9, 1917.

The operation of the arrangement shown in Figures 7 to 9 is essentially the same as that described for the other forms of the invention, differing therefrom principally in that a spring and a pivotal bearing are used in place of the yielding, resilient blocks of the other forms of the invention, in the first of which the resilient members are subjected to compressional strains and in the second of which the resilient members are subjected to shearing strains.

Figure 10:
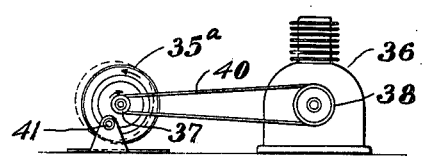
Figure 10 is a diagrammatical ilustration of a motor driven refrigerator compressor unit illustrating one application of the invention.

Diagrammatical view Figure 10 illustrates the general manner of operation of the various forms of this invention. In this figure there is shown by way of example, a motor 35ª for driving a compressor 36 by means of a motor pulley 37 and a compressor pulley 38 which are connected to each by a belt 40. The motor pulley is driven in a clockwise direction and the reaction on the motor stator is in a counter-clockwise direction tending to rotate the entire motor about its pivotal mounting 41 in a direction to tighten the belt 40 as indicated by the dotted line position of the motor which it assumes on starting or when subjected to an overload.

Another important feature of this invention is that of reducing to negligible quantities the noises ordinarily generated in an electric motor as for example the noises produced by the circumferential vibrations occasioned in the operation of the motor by the separate power impulses imparted to the rotor or armature of the motor. Vibrations due to the pulsatory torque of an electric motor are ordinarily of small amplitude and the soft rubber mountings shown in the three different forms of the invention are sufficiently yielding to permit the motor to vibrate freely a slight amount without transmitting such vibrations to the motor support to any great extent.

Prior to this invention both sound absorbing, electrically insulated, flexible motor mountings and mountings making use of the reaction between the forces of the fixed and movable elements of a motor to automatically maintain proper tension on a belt have been proposed. The present invention seeks to combine in a simple and inexpensive way a vibration absorbing motor mounting which will also utilize the reaction between the stator and rotor of a motor to automatically maintain proper tension on a power transmission belt to which the rotor is connected. This result is accomplished by supporting the motor for free vibrational movements and also for movement about an axis eccentric to the motor axis.

Furthermore it is to be understood that the particular forms of apparatus shown and described, and the particular procedure set forth are presented for purposes of explanation and that various modifications of said apparatus and procedure can be made without departure from this invention as described in the appended claims.

Having thus described our invention what we claim is:

1. The combination with an electric motor having a frame with a pair of aligned non-circular recesses, one in each of the ends of the motor frame and to one side of the motor axis, of soft yielding members of complementary outline received in said recesses, and a motor supporting structure including non-circular parts received in said yielding members whereby the motor is free to oscillate a limited amount about the axis of said members.

2. The combination with an electric motor having a frame with a pair of aligned recesses, one in each of the ends of the motor and to one side of the motor axis, of soft yielding members of complementary outline received in said recesses, and a motor supporting structure including parts received in said yielding members and configurated so as to subject the same to compressional strains when the motor frame is moved whereby the motor is free to oscillate a limited amount about the axis of said members.

3. The combination with an electric motor having a frame with a pair of aligned non-circular recesses, one in each of the ends of the motor frame and to one side of the motor axis, of soft yielding members of complementary outline received in said recesses, and a motor supporting structure engaging said members whereby the motor is free to oscillate a limited amount about the axis of said members, said motor supporting structure including plate-like elements one of which is received in and projects from each of said members.

4. The combination with an electric motor having a frame with a pair of aligned recesses, one in each of the ends of the motor frame and to one side of the motor axis, of soft yielding members of complementary outline received in said recesses, and a motor supporting structure engaging said members whereby the motor is free to oscillate a limited amount about the axis of said members, said motor supporting structure including sheet metal brackets having bent-over upper ends which are received in said members.

JOHN J. McCABE.
PAUL E. FRANTZ.